United States Patent [19]

Taborsky

[11] Patent Number: 5,304,365
[45] Date of Patent: Apr. 19, 1994

[54] TREATING WASTEWATER WITH ALUMINOSILICATES WITH MODIFIED CATION AFFINITY

[76] Inventor: Petr Taborsky, 14535 Bruce B. Downs Blvd., Tampa, Fla. 33613

[21] Appl. No.: 907,813

[22] Filed: Jul. 2, 1992

Related U.S. Application Data

[62] Division of Ser. No. 771,389, Oct. 3, 1991, Pat. No. 5,162,276, which is a division of Ser. No. 294,160, Jan. 6, 1989, Pat. No. 5,082,813.

[51] Int. Cl.$^5$ ............................................. C02F 1/42
[52] U.S. Cl. .................................. 423/352; 210/681
[58] Field of Search ..................... 210/681; 423/352

[56] References Cited

U.S. PATENT DOCUMENTS

| | | | |
|---|---|---|---|
| 3,723,308 | 3/1973 | Breck | 210/681 |
| 4,344,851 | 8/1982 | Sherman et al. | 210/681 |
| 4,522,727 | 6/1985 | Weber | 210/681 |
| 4,686,198 | 8/1987 | Bush et al. | 210/681 |
| 4,693,828 | 9/1987 | Yoshioka et al. | 210/681 |

OTHER PUBLICATIONS

J. R. Klieve and M. J. Semmons, "an Evaluation of Pretreated Zeolites for Ammonium Revoval," *Water Research*, vol. 14, pp. 161–168 (Pergamon Press, 1980).

*Primary Examiner*—Wayne Langel
*Attorney, Agent, or Firm*—Charles A. McClure

[57] ABSTRACT

Mineral aluminosilicates enhanced as ion-exchange media for separating diverse ionic materials are provided by dry heating. A hydrated mineral alumino-silicate is irreversibly dehydrated in part, to improve the ratio of its affinity for preferred ions, relative to non-preferred ions, even though doing so reduces its affinity for both types of ions. Such dehydration is accomplished by heating the aluminosilicate until a temperature is reached at which its affinity for non-preferred cations is reduced enough that the ratio of its affinity for preferred ions to its affinity for non-preferred ions is greatly increased. Such aluminosilicates may be zeolites, such as clinoptilolite, or layered clays, such as vermiculite or smectite. 850° C. is an example of such temperature.

6 Claims, 1 Drawing Sheet

TREATING WASTEWATER WITH ALUMINOSILICATES WITH MODIFIED CATION AFFINITY

This is a division of application Ser. No. 771,389 filed Oct. 3, 1991, U.S. Pat. No. 5,162,276, which is a division of Ser. No. 294,160 filed Jan. 6, 1989, U.S. Pat. No. 5,082,813.

FIELD OF THE INVENTION

This invention relates to aluminosilicates with differential affinity for diverse cationic materials, including modification and use thereof for the separation of such materials, as in recovery of monovalent ions of nitrogenous materials from solutions including polyvalent cations, such as in treatment of wastewaters containing alkaline earth metal ions as well as ammonium ions.

BACKGROUND OF THE INVENTION

Effluents from agricultural, aquacultural, many commercial or industrial processes, and sanitary facilities are rich in dissolved nitrogen-containing materials from which valuable fertilizers can be produced. When more than slightly alkaline, such effluents usually emit ammonia and often volatile amines, and re-use of effluent water usually requires their substantial elimination. Frequently other dissolved materials, such as alkaline earth metals, interfere with recovery processes, often accumulating in the system and tending to insoluble deposits restrictive of normal flow—risking inoperation and adding excessively to the cost of the overall operations.

Aluminosilicates are known as ion-exchange media in effecting separation and recovery of dissolved materials from such effluents or wastewaters generally. Aluminosilicate minerals occur in many geographical locations and include prominently for present purposes zeolites, such as chabazite, clinoptilolite, erionite, mordenite, and phillipsite; and layered clay minerals, such as vermiculites and smectites.

The foregoing minerals are hydrated mixed aluminosilicates, with compositions determined largely by the available constituents when they were formed, resulting in diverse crystalline structures. Synthetic aluminosilicates have been produced with more controlled compositions, and often are designated by a letter (e.g., "F", "X") appended to "zeolite." Whether produced under laboratory conditions or in mineral deposits, aluminosilicates range widely in composition, often including alkali metals, such as sodium and potassium, and/or alkaline earth metals, such as magnesium and calcium, and also iron, for example. Their identification, as well as their properties, can vary widely, depending upon their characteristics of interest. The present interest tends to focus upon composition and arrangement of accessible surfaces and sites important to ion-exchange.

Many, if not all or most, aluminosilicates have a characteristic affinity for cations (or anions), which they capture or "take up" in what is considered to be chiefly, but not necessarily exclusively, a surface phenomenon of adsorbing, and may also be partly a solution phenomenon of absorbing, and/or other micromolecular phenomena—and often called just "sorbing" or "sorption," "taking up" or "uptake," or simply "affinity"—which usually differs for dissimilar ions.

Selected aluminosilicates enable ammonium ion and various metal ions to be separated from wastewaters, as disclosed by Weber in U.S. Pat. No. 4,522,727, for example. Preferential zeolitic separation of ammonium (plus heavy metals) from alkali metal ions in solution is taught by Hagiwara and Uchida, using a modified mordenite (zeoharb) in "Ion-Exchange Reactions of Processed Zeolite and Its Applications to the Removal of Ammonia-Nitrogen in Wastes" (at pp. 463–470) in Natural Zeolites, etc., International Conference 1976, published by Pergamon in 1978. Breck in U.S. Pat. No. 3,723,308 characterizes an artificial zeolite (F) as useful to remove ammonium without removing so much alkali or alkaline earth metals as may occur with natural zeolites. So far, however, an effective low-cost remedy for metallic contamination in aluminosilicate recovery of ionic nitrogen materials has been lacking—though badly needed. My invention addresses that need and provides an efficacious and altogether unexpected remedy.

SUMMARY OF THE INVENTION

In general, the objects of this invention are met, in aluminosilicates having affinity for cations of diverse valences, including zeolites and layered clays having differential affinity for diverse ions. More particularly, such aluminosilicates are provided with a reduced affinity for materials with polyvalent (divalent or higher) cations, in favor of monovalent ions, such as ammonium ion.

In method terms, such objects are attained by heat pretreating such a given aluminosilicate (dry) to modify its predisposition to take up cations, as by reducing its affinity for such metal cations relative to its affinity for monovalent nitrogen-containing cations. In more detail, such pretreatment increases the relative affinity or takeup ratio of such aluminosilicate for ammonium (etc.) ions at the expense of divalent ions, for example. Although such heating reduces the absolute affinity for ammonium—and, thus, goes against accepted wisdom of the art—it substantially eliminates such affinity for the alkaline earth metals, such as calcium and magnesium. Hence, it improves the overall efficiency and economy of ammonium separation. Differential affinity of aluminosilicates for other diversities of ions can be enhanced and be utilized to good effect in like manner.

A primary object of the present invention is to eliminate the interference of metallic ions of higher valences in ion-exchange recovery of ammonium or other monovalent nitrogen-containing ions, such as from wastewaters.

Another prime object is non-chemical modification of mineral aluminosilicates for improved suitability for ammonium recovery.

A further object of this invention is to minimize attrition of aluminosilicates used as ion-exchange media in separation processes.

Yet another object is to conserve energy in ammonia recovery.

A still further object of this invention is to accomplish the foregoing objects in as economical a manner as possible.

Other objects of the present invention, together with means and methods for attaining the various objects, will become apparent from the following description of one or more preferred embodiments of it, presented by way of example rather than limitation and supplemented by the accompanying drawings.

DETAILED DESCRIPTION

Figure 1:
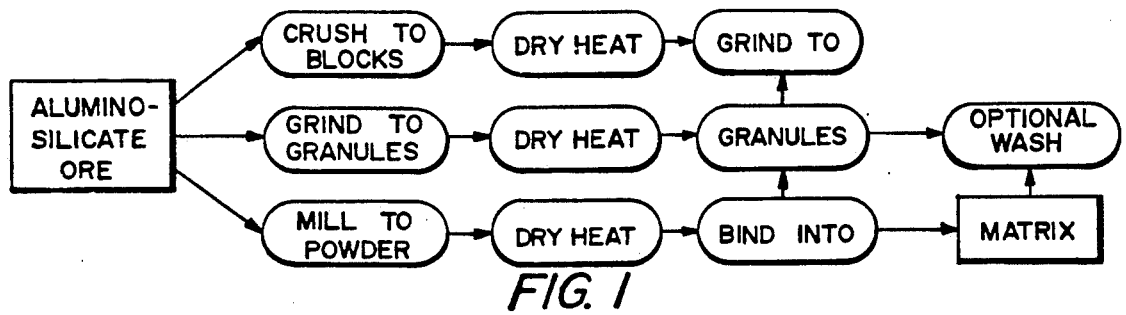
FIG. 1 is a schematic flow diagram, in block form, of aluminosilicate ore refinement together with heating pretreatment thereof according to the present invention.
Figure 2:
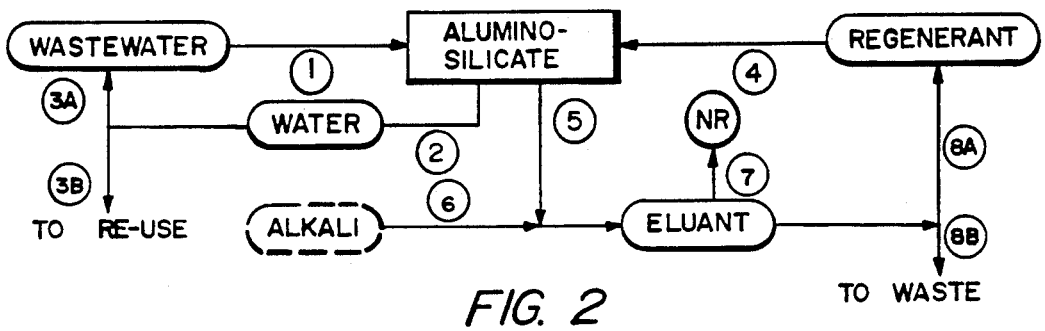
FIG. 2 is a similar schematic diagram of a wastewater ammonium separation process according to this invention.

In both FIGS. 1 and 2 the steps of the respective processes are shown within racetrack outlines, while the materials are identified inside rectangular outlines.

FIG. 1 shows schematically procedures of refining an aluminosilicate ore and the mineral recovered from it, with heat treating of the resulting aluminosilicate for use as an ion-exchange medium, according to the present invention. The ore may be so treated at any stage of subdivision, from block to granular to powder form. If so treated in block form, it is comminuted later to either of the latter forms. If in powder form it optionally may be heated again, alone or with other finely divided material to consolidate it into granular form or may be combined with a supporting matrix material to bind it for use.

In FIG. 1, aluminosilicate ore (rectangular outline at left) is subjected to any of three degrees of subdivision—parallel lines with arrowheads to right—labeled (i) CRUSH TO BLOCKS, (ii) GRIND TO GRANULES, and (iii) MILL TO POWDER, respectively. The next step for each of them is DRY HEAT—which is explained in more detail below. At the right on the middle line (within rectangular outline) the pretreated material is identified as GRANULES. The next step for the blocks of aluminosilicate (on the top line) is GRIND TO similar GRANULES, whereas for the aluminosilicate powder (on bottom line) the step BIND INTO divides into two alternatives: (i) GRANULES or (ii) MATRIX or similar supporting medium. The granular material—from whatever path—may be subjected to an OPTIONAL WASH step to prepare it for use as an ion-exchange medium, as to neutralize with a weakly acid solution metal oxides resulting from the heating, or to place it in desired starting form, such as $Na^+$, $K^+$, or $H^+$, etc.

FIG. 2 shows in schematic form successive steps of wastewater processing numbered in order according to this invention. In step 1, ALUMINOSILICATE (top center) receives WASTEWATER over or through it, resulting in step 2 in treated WATER (at least partly ion-exchanged) that either is returned for another pass therethrough as WASTEWATER in step 3A or, usually, is sent to RE-USE (as water) in alternative step 3B. In step 4, brine or equivalent REGENERANT (alkaline) is passed over and/or through the ZEOLITE, resulting, in step 5, in an ELUANT, which contains at least some of the ions taken up by the ALUMINOSILICATE from the WASTEWATER. Optionally adding ALKALI (in broken lines), such as NaOH, to the ELUANT in step 6 raises the pH suitably, facilitating recovery of NR (ammonia and/or amines) in step 7, as by gas sparging, and serving as makeup for the ELUANT, which—less the recovered composition(s)—usually is recycled as REGENERANT to the ZEOLITE for another pass at regenerating it in step 8A or, if exhausted is sent to WASTE in step 8B.

It will be understood here that apparatus for implementing the foregoing steps is readily available and may be either conventional or developmental and that the quantity of wastewater to be processed will determine the scale of the apparatus or its frequency of use (or both). Such processing is inherently cyclical whether carried out in continuous or in successive batch form. Gradual makeup of regenerant is preferable, especially in continuous processing.

Ion-exchange material is often used as granules in a packed column, to whose top the aqueous liquid to be treated is pumped and through which it flows—by gravity or under pumping pressure—and from which the (at least partly) ion-exchanged water is collected in suitable manner and equipment for recycling through the treating ion-exchange material or for re-use as water. Instead, the wastewater may be pumped into the bottom and out the top of the treating column, if preferred. Similarly the regenerant, usually a brine, such as sea water, rich in monovalent alkali metal ions (preferably potassium or sodium) able to displace the ions taken up by the ion-exchange material, is pumped to the column and is passed through it in counter-current manner but with like overall effect.

It should be noted that for removal of ammonium—or monovalent amine—ions without loss of ammonia (or volatile amines) the pH of the wastewater being or to be treated is adjusted, if necessary, in view of the ammonium/ammonia equilibrium. It should not be higher than about 7.5 and in practice is usually at least mildly acidic. The pH of the regenerant liquid should be adjusted accordingly in the opposite direction and usually is between about 10 and 12. Both ion-exchange and regeneration may be practiced at room temperature or mildly increased temperature. Regeneration is accelerated somewhat at higher temperature—with concurrent loss of water vapor. Any unavailing heating represents an unnecessary energy cost.

Mineral aluminosilicates are hydrated, as already noted. They undergo reversible and irreversible dehydration with dry heating. The former occurs with almost any appreciable temperature increase and overlaps the latter, which begins at higher temperatures. In clinoptilolite, for example, irreversible dehydration commences at about 300° C., becomes appreciable at about 500° C., and ceases by at most about 900° C. Evolution of non-aqueous gas (such as $CO_2$) also occurs within the latter part of this range and is substantially complete by about the latter temperature. Between 900° and 1000° C. most mineral aluminosilicates become quite consolidated, as nearly all the water and evolvable non-aqueous gas have been driven off. As will become apparent, ion-exchange capabilities are affected in fairly definite fashion in accordance with such characteristics.

Figure 3:
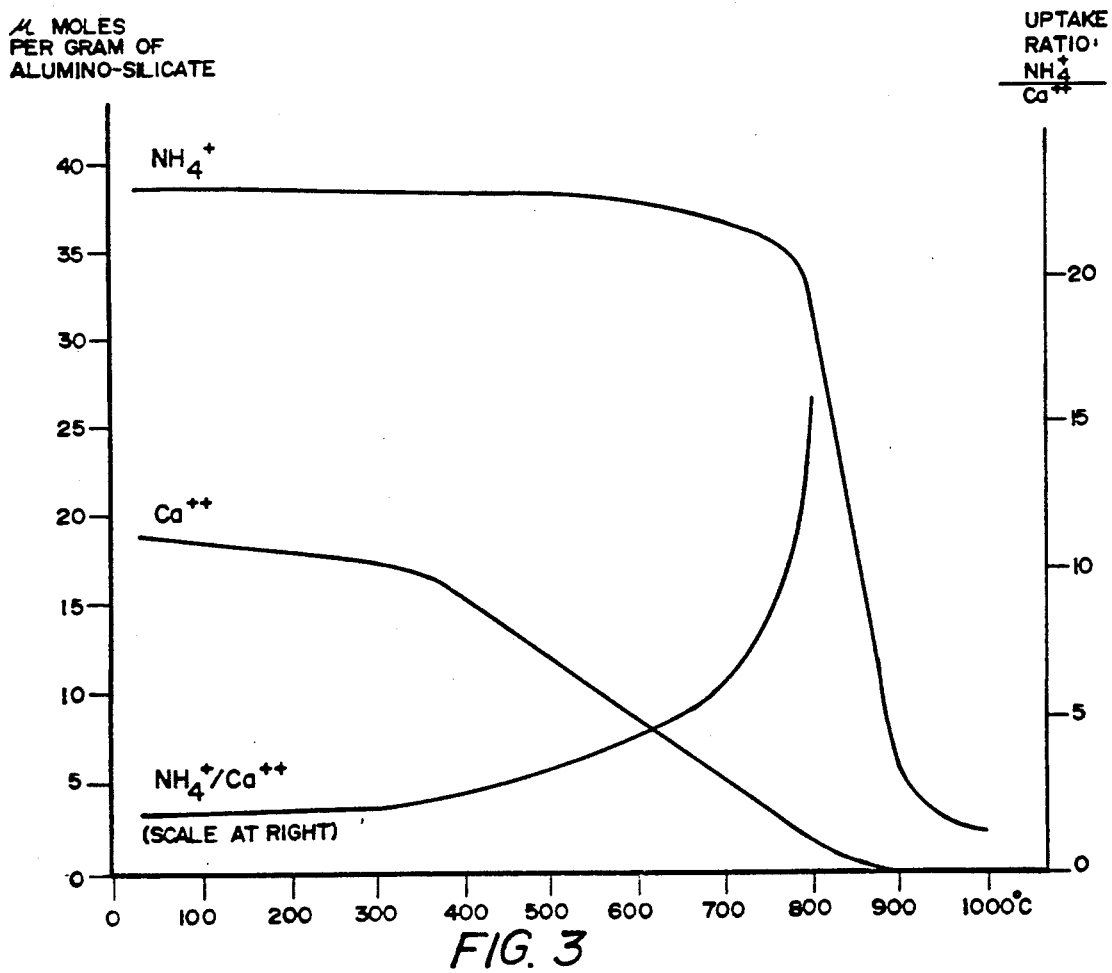
FIG. 3 is a composite graph of (i) ammonium and calcium uptake by an aluminosilicate from aqueous medium vs. such aluminosilicate pretreatment temperature, and (ii) ratio of such ammonium uptake to such calcium uptake.

FIG. 3 shows graphically (i) uptake of both ammonium ions and calcium ions in micromoles/gram of aluminosilicate vs. pretreatment temperature, and (ii) ratio of such ammonium uptake to such calcium uptake. The ordinate scale for the individual ionic uptakes is at the left, and the ordinate scale for the ionic uptake ratio is at the right. The abscissa temperature scale range is 0° to 1000° C. The aqueous liquid treated in producing the graphed data was a solution of 50 parts per million (ppm) calcium and 25 ppm ammonium. The aluminosilicate was a commercial grade of clinoptilolite, which was heat-pretreated according to this invention, as described below. The contact time of the aluminosilicate and the liquid being treated was two hours (batch process), and the treated liquid was recovered by vacuum-filtration. The calcium content was determined via an atomic absorption spectrophotometer, and the ammonium content was determined by an Orion ammonia gas electrode.

It is apparent from FIG. 3 that the affinity of the aluminosilicate for the $Ca^{++}$ ion, as indicated by its uptake, dropped off slightly at a gradually increasing rate until about 300° C., then fell off at an increased and remarkably linear rate until nearing the axis at about 800° C., and finally tailed off to about nil in the next hundred degrees. In contrast, the affinity for ammonium ion, as measured by its uptake, changed little until about 500° C., then fell at a gradually increasing but still relatively slight rate until a pronounced "knee" between about 750° and 800° C., and then dropped precipitously until nearing the axis at about 900° C., and finally tailed off in the next hundred degrees or so. Their relative uptakes, $CA^{++}/NH_4^+$, indicated by the ratio scaled at the right, rose gradually through the first several hundred degrees, then rose at a gradually increasing rate through the next several hundred degrees, climbed rapidly from about 700° C.—at which point the ratio had reached about five times the initial ratio—through 800° C., where its gradient was nearly perpendicular—and the ratio had risen about an order of magnitude (i.e., tenfold) overall.

It is apparent from the foregoing description and illustration that hydrated aluminosilicates of interest for present purposes are those that exhibit differential affinity for materials with diverse cations. A simple distinction of this sort may be drawn between monovalent and polyvalent ions. As an example here, monovalent nitrogen-containing ions have been contrasted with divalent ions, with the benefit of facilitating separation of ammonium ions from calcium ions. It should be understood that valence is not a sole determinant of relative affinities because other factors, such as ionic shape and size, for example, are also important, but it may be used as a rule of thumb in determining what to investigate.

Similarly, irreversible dehydration can be considered as a guide to desired degree of dry heat treatment to provide useful aluminosilicates according to this invention, although in actual practice, the absolute and relative affinities of given aluminosilicates for given ionic materials are the ultimate determinants. As a rule of thumb, an aluminosilicate can be improved in ionic selectivity by heating samples of it to a range of temperatures to about a thousand degrees C. and checking the degree of their dehydration—by comparing the amount of water they will take up after cooling. Upon the occurrence of a drastic change in the rate of dehydration with temperature, a preheating temperature within about fifty to a hundred degrees above such temperature should prove efficacious for separating materials with dissimilar ions. Another rule of thumb, easier to apply although perhaps less definitive is evolution of non-aqueous gas with temperature change, for which a temperature about fifty to a hundred degrees below the temperature of maximum evolution rate is considered preferable.

The dry heating treatment of this invention may be performed by applying the desired temperature continuously or in discontinuous stages. The temperature to be applied can be determined in advance as indicated above. For aluminosilicates having affinity for both ammonium ions and for metal ions of higher valence, such a preheating temperature is usually at least about 700° C., preferably from about 800° and 850° C., and at most about 900° C. Non-aqueous gas evolution from clinoptilolite peaks at about 850° C., and many or most (if not all) hydrated aluminosilicates are believed similar in this regard.

Although theoretical interpretation of the effect of such heat pretreatment is not essential to the teaching or the practice of the present invention, it appears that aluminosilicates of interest have separate and distinct takeup sites for ammonium ions and for divalent metal cations, for example. Heating the aluminosilicate is effective to deactivate such ion takeup sites at different rates, the ammonium sites at a low rate initially then at a greatly increased rate, and the divalent ions at an intermediate rate beginning sooner and then substantially depleting such sites before depletion of the ammonium sites. Consequently, the ratio of sites for the uptake of ammonium to sites for the uptake of divalent ions rises drastically as the depletion of divalent sites is approached. This interpretation is offered for whatever aid it may be to workers in this art, rather than as any definition of the inventive method.

Aluminosilicates vary appreciably in composition as well as in affinity for various ions. However, zeolites, vermiculites, and smectites having an affinity for both ammonium and calcium ions are expected to be substantially like clinoptilolite in this important respect. Among other zeolites, phillipsite is of special interest as, like clinoptilolite, it has an especial affinity for ammonium. Synthetic aluminosilicates exhibiting similar affinities should be enabled similarly by such heating pretreatment for preferential separation of ammonium ions from alkaline earth ions in wastewaters containing them in substantial part.

It should be understood that foregoing general references to ammonium (as distinguished from specific ammonium data) is not to be limited to the ammonium ion alone. Instead it applies in like manner to monovalent nitrogen-containing cations ($NR^+$), where R includes R1, R2, R3, and R4, each of which is hydrogen or other amine substituent, itself optionally substituted by halogen or by other suitable substituent. Included are lower alkyl amines (from one to four carbon atoms per amine substituent), such as trimethyl amine, diethyl amine, isopropyl and butyl amines. Heterocyclic or mixed amines may be similarly recoverable.

Advantages and benefits in economy and efficiency of treating wastewaters according to this invention have been mentioned, and ranges of operating conditions have been specified. Wastewater is a general term for whatever aqueous liquids are susceptible to ion exchange as described in this specification. As noted, not only is ammonium so recoverable but so are monovalent ions containing amine substituents. Many other diverse ions are similarly separable.

Variations in methods and materials have been set forth so as to indicate the scope and versatility of the procedures described. Other modifications may be made, as by adding, combining, deleting, or subdividing parts or steps, while retaining at least some of the advantages of this invention—which itself is defined only in the following claims.

I claim:

1. In a process of recovering ammonia as ammonium from aqueous liquid containing divalent calcium by using a mineral aluminosilicate as an ion-exchange medium,
   the improvement comprising the steps of
   preheating the aluminosilicate in dry condition between about 750° and 900° C. to reduce the subsequent takeup of calcium ions relative to the takeup of ammonium ions thereby,
   contacting the aluminosilicate with the aqueous liquid at an ammonium-conducive pH determined from the $NH_3/NH_4^+$ equilibrium, and
   displacing ammonium from the aluminosilicate by an aqueous wash containing alkali metal ions during subsequent regeneration at an ammonia-conducive pH determined from the $NH_3/NH_4^\pm$ equilibrium.

2. Ammonium recovery process according to claim 1, wherein during displacement the ammonium is converted to ammonia and is recovered as ammonia gas.

3. In a process of recovering ammonia as ammonium from aqueous liquid containing divalent calcium by using a mineral aluminosilicate comprising a zeolite as an ion-exchange medium,
   the improvement comprising the steps of
   preheating the zeolite in dry condition between about 750° and 900° C. to reduce the subsequent takeup of calcium ions relative to the takeup of ammonium ions thereby,
   contacting the zeolite with the aqueous liquid at an ammonium-conducive pH determined from the $NH_3/NH_4^+$ equilibrium, and
   displacing ammonium from the zeolite by an aqueous wash containing alkali metal ions during subsequent regeneration at an ammonia-conducive pH determined from the $NH_3/NH_4^+$ equilibrium.

4. Ammonium recovery process according to claim 3, wherein the zeolite comprises clinoptilolite in major part and is preheated to about 800° to 850° C. in the first step.

5. In a process of recovering ammonia as ammonium from aqueous liquid containing divalent calcium by using a mineral aluminosilicate as an ion-exchange medium,
   the improvement comprising the steps of
   preheating the aluminosilicate in dry condition between about 750° and 900° C. to reduce the subsequent takeup of calcium ions relative to the takeup of ammonium ions thereby,
   contacting the aluminosilicate with the aqueous liquid at an ammonium-conducive pH of at most about 7.5 determined from the $NH_3/NH_4^+$ equilibrium, and
   displacing ammonium from the aluminosilicate by an aqueous wash containing alkali metal ions during subsequent regeneration at an ammonia-conducive pH determined from the $NH_3/NH_4^+$ equilibrium.

6. Ammonium recovery process according to claim 5, wherein the pH is acidic.

* * * * *